US009465832B1

(12) United States Patent
Levin et al.

(10) Patent No.: US 9,465,832 B1
(45) Date of Patent: Oct. 11, 2016

(54) EFFICIENTLY COMMITTING LARGE TRANSACTIONS IN A GRAPH DATABASE

(71) Applicant: International Business Machines Corporation, Armonk, NY (US)

(72) Inventors: Roy Levin, Yakov (IL); Haggai Roitman, Yoknea'm Elit (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/015,280

(22) Filed: Feb. 4, 2016

(51) Int. Cl.
    *G06F 17/30* (2006.01)
(52) U.S. Cl.
    CPC ... *G06F 17/30377* (2013.01); *G06F 17/30958* (2013.01)
(58) Field of Classification Search
    USPC ........................................ 707/703, 708, 769
    See application file for complete search history.

(56) References Cited

U.S. PATENT DOCUMENTS

| 6,606,613 | B1 * | 8/2003 | Altschuler | G06Q 10/10 706/21 |
| 8,204,885 | B2 * | 6/2012 | Herrnstadt | G06F 17/30315 707/737 |
| 8,700,585 | B2 | 4/2014 | Vaghani et al. | |
| 8,732,143 | B2 | 5/2014 | Falkebo et al. | |
| 8,797,178 | B2 * | 8/2014 | Kansal | H04Q 9/00 340/870.01 |
| 2005/0261914 | A1 | 11/2005 | Brookins | |
| 2011/0173189 | A1 * | 7/2011 | Singh | G06F 17/30958 707/722 |
| 2013/0104107 | A1 * | 4/2013 | De Smet | G06F 11/3664 717/125 |
| 2015/0026158 | A1 * | 1/2015 | Jin | G06F 17/30979 707/722 |
| 2015/0054831 | A1 * | 2/2015 | Grandhi | G06F 17/30994 345/440 |
| 2015/0310129 | A1 * | 10/2015 | Ushijima | G06F 17/30557 707/798 |

FOREIGN PATENT DOCUMENTS

CN         102193975 B        1/2013

OTHER PUBLICATIONS

Bachman, Michael. GraphAware: Towards Online Analytical Processing in Graph Databases. Thesis. Imperial College London Department of Computing, Spring 2013, 149 pgs.
Sadoghi et al., "Reducing database locking contention through multi-version concurrency", Proceedings of the VLDB Endowment, vol. 7, Issue 13, Aug. 2014, pp. 1331-1342.

* cited by examiner

*Primary Examiner* — Cam-Linh Nguyen
(74) *Attorney, Agent, or Firm* — Cantor Colburn LLP; David Quinn

(57) ABSTRACT

A computer-implemented method includes receiving a transaction, where the transaction includes a plurality of operations and is applicable to a graph database. The transaction is represented by a transaction graph, which is a dependency graph representing dependencies among the plurality of operations of the transaction. The transaction graph is partitioned, by a computer processor, into two or more transaction subgraphs. Each of the two or more transaction subgraphs includes two or more operations of the transaction, and each of the two or more transaction subgraphs is a dependency graph representing dependencies among the two or more operations of the transaction subgraph. The two or more transaction subgraphs are independent of one another. The two or more transaction subgraphs are applied to the graph database in parallel, where applying each transaction subgraph to the graph database includes applying the two or more operations of the transaction subgraph to the graph database.

17 Claims, 4 Drawing Sheets

EFFICIENTLY COMMITTING LARGE TRANSACTIONS IN A GRAPH DATABASE

BACKGROUND

Embodiments of the present invention relate to graph databases and, more specifically, to efficiently committing write large transactions in a graph database.

Graph databases are drawing increased attention from both industry and academia, mostly due to the proliferation of Online Social Networks (OSNs) and Linked Data, which can both be conveniently represented by graph databases. In a graph database, each entity is represented by a vertex of a graph, and an edge between two vertices represents a relationship between the two entities represented by those vertices. For example, in the case of an OSN, an edge between two vertices may represent a friendship or connection between two people represented by those vertices.

In many cases, there may be a large and continuous stream of data flowing into the graph database, which requires many graph update operations. For example, such an update may be the addition of an edge between two vertices. This update would require a modification of each vertex involved, to add one endpoint of the edge to that vertex. As with many Database Management Systems (DBMS), when adding this new data to the graph, actions may be taken to ensure consistency and reduce invalidation of data.

Some transactions may be large and involve many vertex and edge CRUD operations, which are operations that create, read, update, or delete data. Many operations can be batched together into a large transaction, and the use of large transactions enables the database engine of the graph database to perform optimizations, such as parallelizing some operations. However, large transactions may require locking many different entities, each represented by a vertex, and possibly keeping them in a temporarily inconsistent state for a long time while other operations of the large transaction execute.

As a result of these large transactions, potential inefficiencies can arise due to reduced throughput. The holding of locks for an extended period can cause multiple failures and retries in accessing locked entities, thus further reducing throughput.

SUMMARY

According to an embodiment of this disclosure, a computer-implemented method includes receiving a transaction, where the transaction includes a plurality of operations and is applicable to a graph database. The transaction is represented by a transaction graph, which is a dependency graph representing dependencies among the plurality of operations of the transaction. The transaction graph is partitioned, by a computer processor, into two or more transaction subgraphs. Each of the two or more transaction subgraphs includes two or more operations of the transaction, and each of the two or more transaction subgraphs is a dependency graph representing dependencies among the two or more operations of the transaction subgraph. The two or more transaction subgraphs are independent of one another. The two or more transaction subgraphs are applied to the graph database in parallel, where applying each transaction subgraph to the graph database includes applying the two or more operations of the transaction subgraph to the graph database.

In another embodiment, a system includes a memory having computer readable instructions and one or more processors for executing the computer readable instructions. The computer readable instructions include receiving a transaction, where the transaction includes a plurality of operations and is applicable to a graph database. Further according to the computer readable instructions, the transaction is represented by a transaction graph, which is a dependency graph representing dependencies among the plurality of operations of the transaction. The transaction graph is partitioned into two or more transaction subgraphs. Each of the two or more transaction subgraphs includes two or more operations of the transaction, and each of the two or more transaction subgraphs is a dependency graph representing dependencies among the two or more operations of the transaction subgraph. The two or more transaction subgraphs are independent of one another. The two or more transaction subgraphs are applied to the graph database in parallel, where applying each transaction subgraph to the graph database includes applying the two or more operations of the transaction subgraph to the graph database.

In yet another embodiment, a computer program product for applying a transaction to a graph database includes a computer readable storage medium having program instructions embodied therewith. The program instructions are executable by a processor to cause the processor to perform a method. The method includes receiving a transaction, where the transaction includes a plurality of operations and is applicable to a graph database. Further according to the method, the transaction is represented by a transaction graph, which is a dependency graph representing dependencies among the plurality of operations of the transaction. The transaction graph is partitioned into two or more transaction subgraphs. Each of the two or more transaction subgraphs includes two or more operations of the transaction, and each of the two or more transaction subgraphs is a dependency graph representing dependencies among the two or more operations of the transaction subgraph. The two or more transaction subgraphs are independent of one another. The two or more transaction subgraphs are applied to the graph database in parallel, where applying each transaction subgraph to the graph database includes applying the two or more operations of the transaction subgraph to the graph database.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Various embodiments of this disclosure enable write operations in a graph database to be efficiently parallelized. To this end, a transaction system according to some embodiments may generate sets of operations, each set represented by a transaction subgraph, where each set is independent. The transaction system may perform those sets of operations asynchronously.

Figure 1:
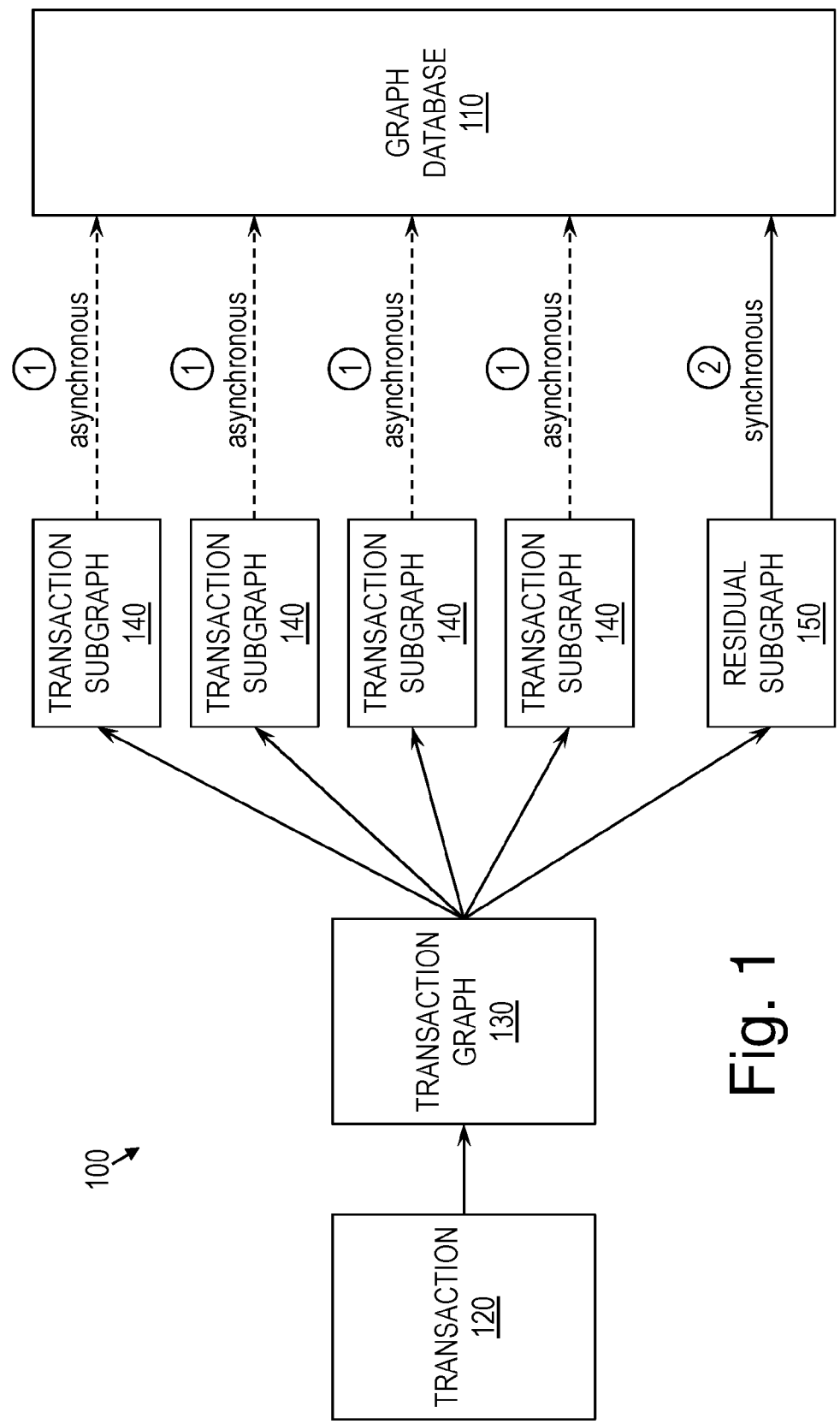
FIG. 1 is a block diagram of a transaction system, according to some embodiments of this disclosure.

FIG. 1 is a block diagram of a transaction system 100, according to some embodiments of this disclosure. As shown, the transaction system 100 may apply a transaction 120 to a graph database 110. The transaction 120 may include a set of operations to be performed on the graph database 110. For example, and not by way of limitation, the graph database 110 may represent a social network, and the transaction may be a batch of modifications to relationships among users of the social network.

To execute the transaction 120, the transaction system 100 may represent the transaction 120 as a transaction graph 130 and may partition the transaction graph 130 into two or more transaction subgraphs 140 as well as a residual subgraph 150. The transaction subgraphs 140 may be applied to the graph database 110 asynchronously, in parallel, and the residual subgraph 150 may be applied synchronously. These activities will be described further below.

Figure 2:
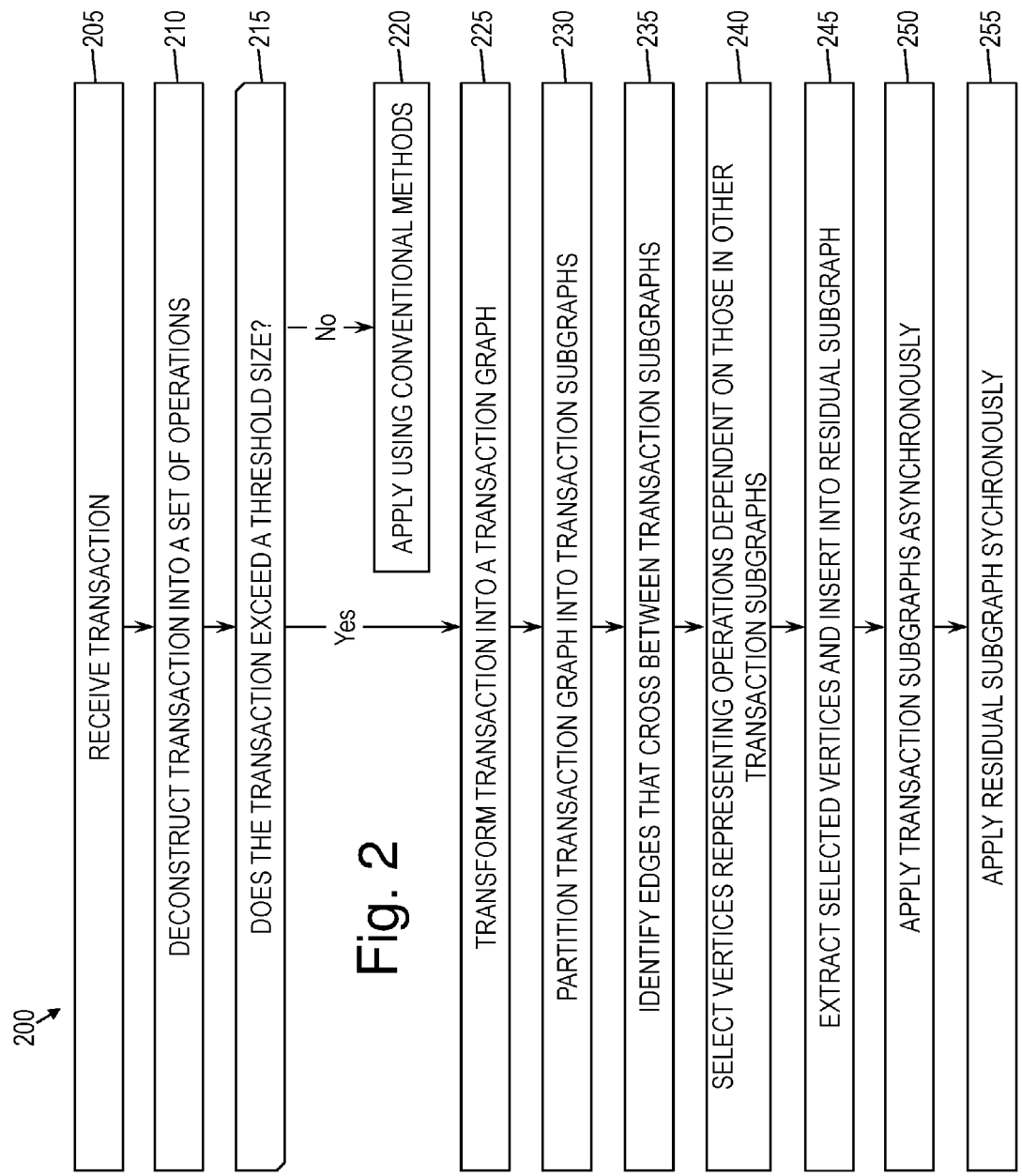
FIG. 2 is a flow diagram of a method for applying a transaction to a graph database, according to some embodiments of this disclosure.

FIG. 2 is a flow diagram of a method 200 for applying a transaction 120 to a graph database 110, according to some embodiments of this disclosure.

At block 205, a transaction 120 may be received at the transaction system 100. At block 210, the transaction 120 may be deconstructed into a set of operations, which may be write operations, each of which may be an insert operation, an update operation, or an upsert operation (i.e., an operation that seeks to update the target of the operation if that target already exists, and otherwise inserts the target) to be performed on one or more entities of the graph database 110. This set of write operations may together make up all or a portion of the transaction 120.

In some embodiments, the transaction system 100 may perform various activities of this disclosure only when the transaction 120 exceeds a threshold size. When the transaction 120 does not exceed this threshold size, it may be the case that the overhead of the activities described below is not worth the efficiencies gained by the activities. Thus, at decision block 215, it may be determined whether the transaction 120 exceeds a threshold size. For example, and not by way of limitation, this size may be defined based on the number of operations in the transaction 120, such that a transaction 120 with a greater number of operations may be considered larger than a transaction 120 with a lesser number of operations. At block 220, if the transaction 120 does not exceed the threshold size, the transaction system 100 may apply the transaction 120 to the graph database 110 using conventional methods.

However, if the transaction 120 exceeds the threshold size, then at block 225, the transaction 120 may be transformed into a transaction graph 130 representing the transaction 120. In some embodiments, the transaction 120 may be initially received in the form of a transaction graph 130, and in that case, there may be no need to perform blocks 210 or 225.

The transaction graph 130 may be a dependency graph, illustrating and representing dependencies of the operations in the transaction 120. In the transaction graph 130, each operation may be represented by a vertex, and each edge may be a directed edge representing a dependency between operations represented by vertices adjacent to that edge. For instance, a first operation may depend on a second operation already having been completed. In that case, the transaction graph 130 may include a directed edge from the second operation to the first operation, representing that the second operation is to be completed before the first operation.

At block 230, a graph partitioning algorithm may be applied to the transaction graph 130. The graph partitioning algorithm may partition (i.e., divide) the transaction graph 130 into two or more transaction subgraphs 140. Further in some embodiments, these transaction subgraphs 140 may be similar in size (e.g., in their number of operations) to one another.

In some cases, one or more edges may cross between two transaction subgraphs 140. These edges may represent dependencies related to operations in different transaction subgraphs 140. For instance, a first edge crossing from a first transaction subgraph 140 to a second transaction subgraph 140 may represent that an operation in the second transaction subgraph 140 is dependent on an operation in the first transaction subgraph 140. According to some embodiments, the final transaction subgraphs 140 to be used below are independent from one another, and thus have no such edges crossing between them.

Thus, at block 235, the transaction system 100 may identify edges that cross between transaction subgraphs 140. At block 240, the transaction system 100 may select each vertex representing an operation that is dependent on another operation in a different transaction subgraph 140. For instance, where a directed edge extends from a first operation to a second operation dependent on the first operation, where the first and second operations are in different transaction subgraphs 140, that second operation may be selected. In other words, in some embodiments, the transaction system 100 may select each operation represented by the vertex at which each identified edge terminates.

At block 245, these selected vertices may be extracted from the transaction subgraphs 140 and placed into the residual subgraph 150. In some embodiments, this residual subgraph 150 may include only the selected vertices. By this mechanism, the transaction system 100 may generate final transaction subgraphs 140 that are independent of one another, along with the residual subgraph 150. Together, the transaction subgraphs 140 and the residual subgraph 150 may be a decomposition of the original transaction graph 130.

Like the transaction subgraphs 140, the residual subgraph 150 may be a dependency graph. The residual subgraph 150 may include directed edges representing dependencies related to the operations represented in the residual subgraph 150. However, the residual subgraph 150 need not be independent of the transaction subgraphs 140, and can include operations that are dependent on operations in the transaction subgraphs 140.

At block 250, the two or more transaction subgraphs 140 may be applied, or joined, to the graph database 110 asynchronously. In other words, the operations represented in the various transaction subgraphs 140 may be applied in parallel, with each transaction subgraph 140 being applied without regard to the status of the other transaction subgraphs 140. In some embodiments, because the transaction subgraphs 140 are independent of one another, no contentions will arise through their parallel execution. However, within each transaction subgraph 140, dependencies may be respected during application to the graph database 110. For instance, a first operation that is dependent on a second operation, where both operations are represented by vertices in a single transaction subgraph 140, may be performed after the second operation is performed.

At block 255, operations in the residual subgraph 150 may be applied to the graph database 110. In some embodiments the operations of the residual subgraph 150 may be applied synchronously, such that no other operations to the graph database 110 can be performed in parallel while the operations of the residual subgraph 150 are being applied.

Referring back to FIG. 1, the circled numerals 1 and 2 indicate the order in which the transaction subgraphs 140 and the residual subgraph 150 are applied to the graph database 110, according to some embodiments of this disclosure. Specifically, as shown, the various transaction subgraphs 140 may be applied in parallel at the same time, and after that, the residual subgraph 150 may be applied. One or more operations of the residual subgraph 150 may be dependent on one or more operations in the transaction subgraphs 140, and thus, this order of operations may ensure dependencies are respected.

In some embodiments, after application of the transaction subgraphs 140 and the residual subgraph 150, all operations of the transaction 120 have been applied. By enabling the operations of the transaction subgraphs 140 to be applied asynchronously, and thus in parallel, these operations can be applied more efficiently than if they were applied synchronously. Thus, the above method 200 may enable efficient execution of a large transaction to a graph database 110.

In some embodiments, the graph partitioning algorithm applied at block 230 may be a balanced graph partitioning algorithm, resulting in the transaction subgraphs 140 being approximately the same size as one another. As a result of the transaction subgraphs 140 being approximately the same size, the application of each transaction subgraph 140 to the graph database 110 may take approximately the same time as the application of the other transaction subgraphs 140. Thus, the time spent waiting for application of the largest transaction subgraph 140 to complete may be relatively small, or minimized. Further, in some embodiments, the size of the residual subgraph 150 may be relatively small, or minimized, thus resulting in a short time for performing the synchronous application of operations in the residual subgraph 150.

Figure 3:
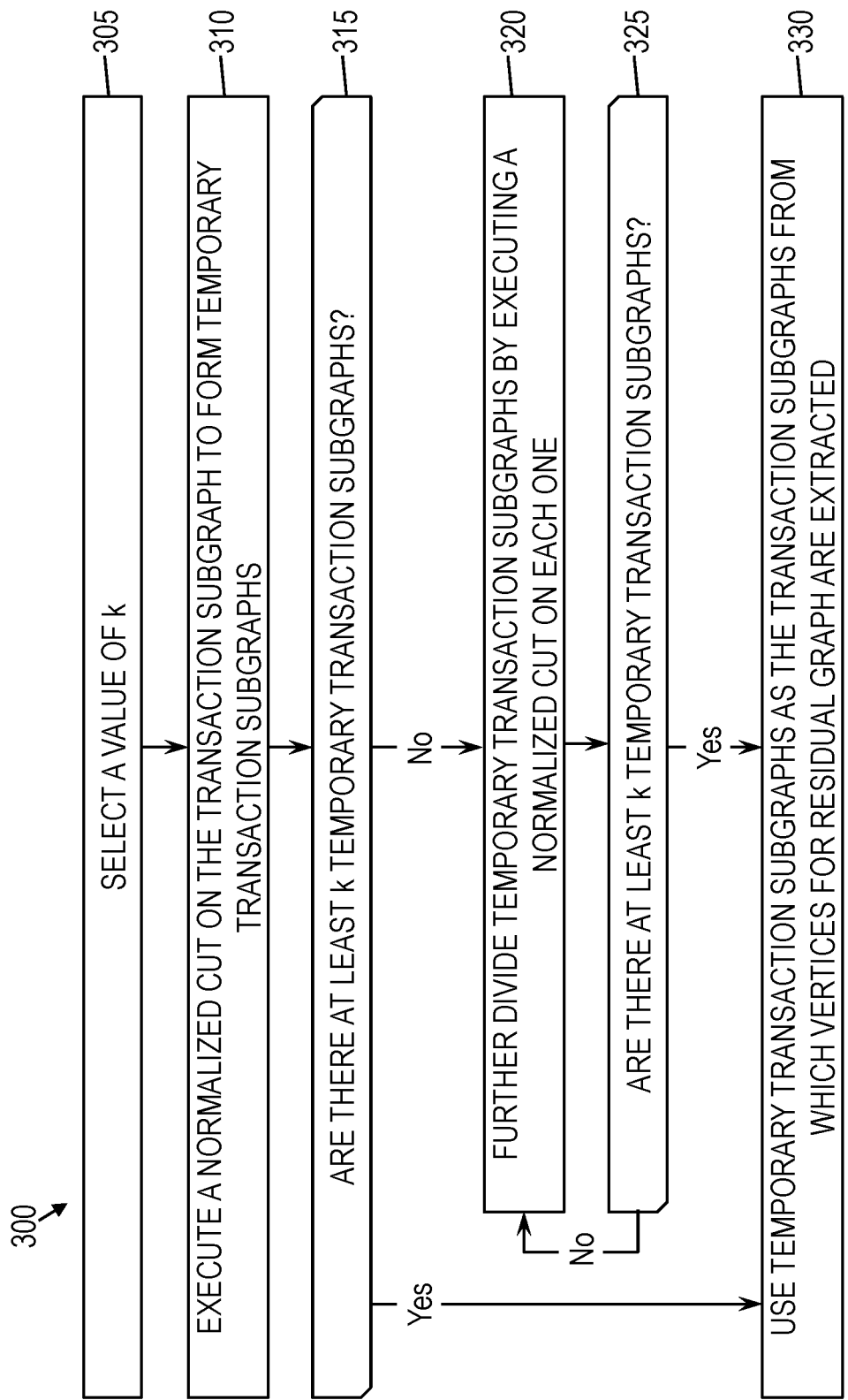
FIG. 3 is a flow diagram of a method for performing a balanced graph partitioning algorithm on the transaction graph, according to some embodiments of this disclosure.

FIG. 3 is a flow diagram of a method 300 for performing a balanced graph partitioning algorithm on the transaction graph 130, according to some embodiments of this disclosure. At block 305, a value k may be selected, where k may be configurable by a user. Given the value of k, the transaction system 100 may run a set of hierarchical clustering divisives, which may be top down, using normalized cuts.

Specifically, at block 310, a normalized cut may be run on a transaction graph TG to result in temporary subgraphs $TG_1$ and $TG_2$. At decision block 315, it may be determined whether there are at least k temporary subgraphs. If there are fewer than k temporary subgraphs, then at block 320, each temporary subgraph may be further divided by running a normalized cut on that temporary subgraph. For instance, a normalized cut may be executed on $TG_1$ to form $TG_{1,1}$ and $TG_{1,2}$, and a normalized cut may be executed on $TG_2$ to form $TG_{2,1}$ and $TG_{2,2}$. At decision block 325, it may again be determined whether there are at least k temporary subgraphs. If there are not at least k temporary subgraphs, then the method 300 may return to block 320, where the temporary subgraphs may be further divided with normalized cuts.

If it is determined at either block 315 or block 325 that there are at least k temporary subgraphs, then at block 330, the temporary subgraphs may be used as the transaction subgraphs 140 from which vertices for the residual subgraph are extracted at block 245. At this point, the number of sets of divisions performed on the transaction graph 130, where each set is the first division of the transaction graph 130 or a division of all existing temporary subgraphs, is d=ceiling ($\log_2$ k). Due to the use of normalized cuts to divide the original transaction graph 130 and each temporary subgraph, the sizes of the resulting transaction subgraphs 140 may be similar to one another.

Figure 4:
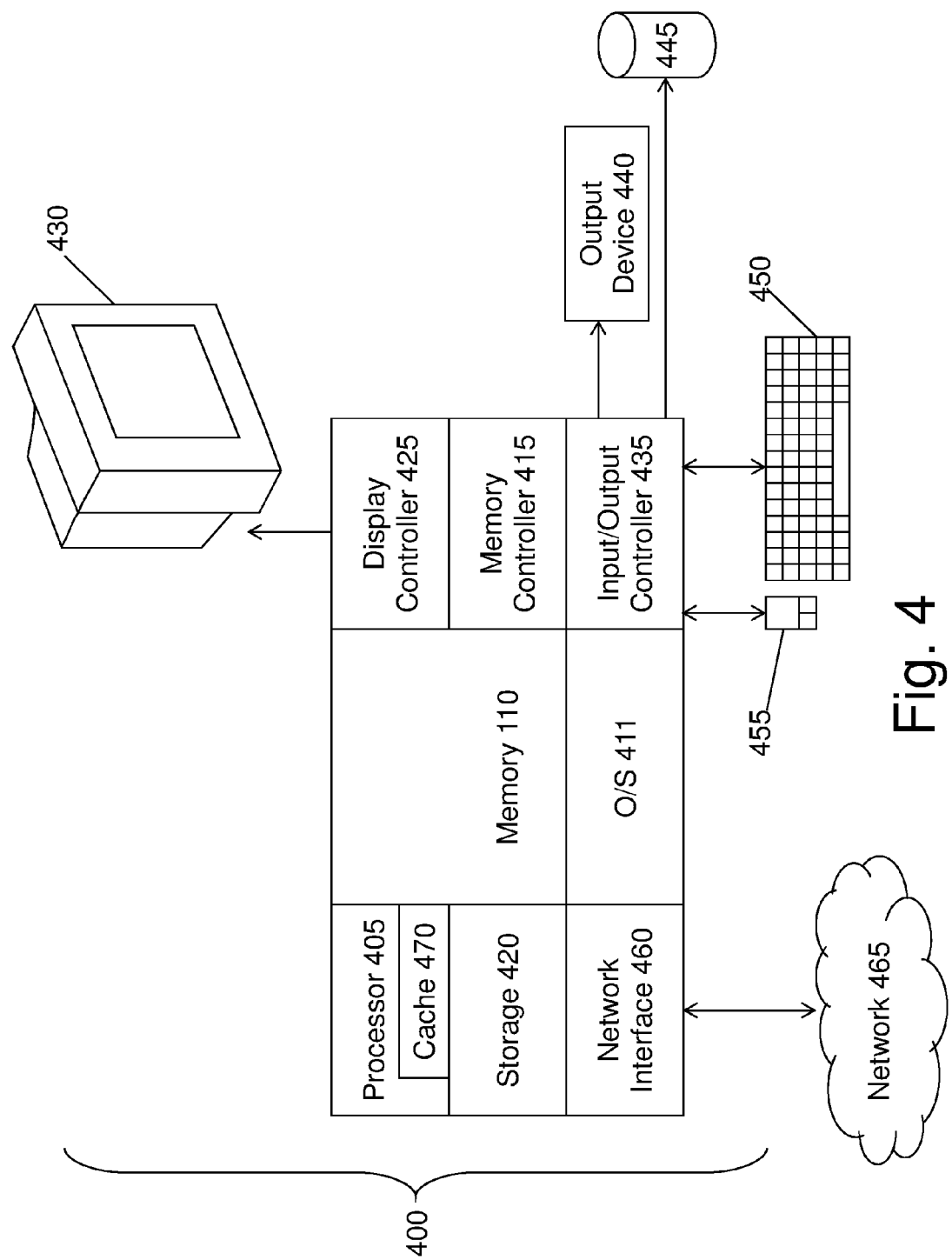
FIG. 4 is a block diagram of a computer system for implementing some or all aspects of the transaction system, according to some embodiments of this disclosure.

FIG. 4 illustrates a block diagram of a computer system 400 for use in implementing a transaction system 100 or method according to some embodiments. The transaction systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, the graph database 110 and the transaction graph 130 may be stored on a computer system 400, and partitioning and application of the transaction graph 130 and transaction subgraphs 140 may be implemented on a computer system 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the transaction systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Transaction systems 100 and methods according to this disclosure may be embodied, in whole or in part, in computer program products or in computer systems 400, such as that illustrated in FIG. 4.

Technical effects and benefits of some embodiments include efficient application of a large transaction to a graph database 110, by way of reducing or minimizing contention. To this end, the transaction may be represented by a dependency graph, which may be divided into transaction subgraphs 140 and a residual subgraph 150, all of which may also be dependency graphs. When the transaction subgraphs 140 are roughly the same size, they may be asynchronously applied to the graph database 110 in an efficient manner, with little wait time. The residual subgraph 150 may be applied to the graph database 110 synchronously.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

receiving a transaction comprising a plurality of operations, the transaction applicable to a graph database;

representing the transaction by a transaction graph, the transaction graph being a dependency graph representing dependencies among the plurality of operations of the transaction;

partitioning, by a computer processor, the transaction graph into two or more transaction subgraphs, each of the two or more transaction subgraphs comprising two or more operations of the transaction, each of the two or more transaction subgraphs being a dependency graph representing dependencies among the two or more operations of the transaction subgraph, and the two or more transaction subgraphs being independent of one another;

wherein the partitioning the transaction graph into two or more transaction subgraphs comprises:

partitioning the transaction graph into two or more intermediate transaction subgraphs;

identifying one or more crossover edges crossing between a first intermediate transaction subgraph and a second intermediate transaction subgraph, the first and second intermediate transaction subgraphs being distinct and belonging to the two or more intermediate transaction subgraphs;

extracting from the first and second intermediate transaction subgraphs each vertex at which at least one of the one or more crossover edges terminates; and inserting each extracted vertex into a residual subgraph; and applying the two or more transaction subgraphs to the graph database in parallel, wherein applying each transaction subgraph to the graph database comprises applying the two or more operations of the transaction subgraph to the graph database.

2. The computer-implemented method of claim 1, further comprising synchronously applying the residual subgraph to the graph database.

3. The computer-implemented method of claim 1, wherein the partitioning the transaction graph into two or more transaction subgraphs comprises applying a balanced partitioning algorithm to the transaction graph.

4. The computer-implemented method of claim 3, wherein the applying the balanced partitioning algorithm comprises executing one or more normalized cuts on the transaction graph.

5. The computer-implemented method of claim 1, further comprising:
   determining that the transaction exceeds a threshold size; and
   performing the partitioning and the applying based on the transaction exceeding the threshold size.

6. The computer-implemented method of claim 1, wherein the graph database represents a social network.

7. A system comprising:
   a memory having computer readable instructions; and
   one or more processors for executing the computer readable instructions, the computer readable instructions comprising:
     receiving a transaction comprising a plurality of operations, the transaction applicable to a graph database;
     representing the transaction by a transaction graph, the transaction graph being a dependency graph representing dependencies among the plurality of operations of the transaction;
     partitioning the transaction graph into two or more transaction subgraphs, each of the two or more transaction subgraphs comprising two or more operations of the transaction, each of the two or more transaction subgraphs being a dependency graph representing dependencies among the two or more operations of the transaction subgraph, and the two or more transaction subgraphs being independent of one another;
     wherein the partitioning the transaction graph into two or more transaction subgraphs comprises:
       partitioning the transaction graph into two or more intermediate transaction subgraphs;
       identifying one or more crossover edges crossing between a first intermediate transaction subgraph and a second intermediate transaction subgraph, the first and second intermediate transaction subgraphs being distinct and belonging to the two or more intermediate transaction subgraphs;
       extracting from the first and second intermediate transaction subgraphs each vertex at which at least one of the one or more crossover edges terminates; and
       inserting each extracted vertex into a residual subgraph; and
     applying the two or more transaction subgraphs to the graph database in parallel, wherein applying each transaction subgraph to the graph database comprises applying the two or more operations of the transaction subgraph to the graph database.

8. The system of claim 7, the computer readable instructions further comprising synchronously applying the residual subgraph to the graph database.

9. The system of claim 7, wherein the partitioning the transaction graph into two or more transaction subgraphs comprises applying a balanced partitioning algorithm to the transaction graph.

10. The system of claim 9, wherein the applying the balanced partitioning algorithm comprises executing one or more normalized cuts on the transaction graph.

11. The system of claim 7, the computer readable instructions further comprising:
    determining that the transaction exceeds a threshold size; and
    performing the partitioning and the applying based on the transaction exceeding the threshold size.

12. The system of claim 7, wherein the graph database represents a social network.

13. A computer program product for applying a transaction to a graph database, the computer program product comprising a computer readable storage medium having program instructions embodied therewith, the program instructions executable by a processor to cause the processor to perform a method comprising:
    receiving a transaction comprising a plurality of operations, the transaction applicable to a graph database;
    representing the transaction by a transaction graph, the transaction graph being a dependency graph representing dependencies among the plurality of operations of the transaction;
    partitioning the transaction graph into two or more transaction subgraphs, each of the two or more transaction subgraphs comprising two or more operations of the transaction, each of the two or more transaction subgraphs being a dependency graph representing dependencies among the two or more operations of the transaction subgraph, and the two or more transaction subgraphs being independent of one another;
    wherein the partitioning the transaction graph into two or more transaction subgraphs comprises:
      partitioning the transaction graph into two or more intermediate transaction subgraphs;
      identifying one or more crossover edges crossing between a first intermediate transaction subgraph and a second intermediate transaction subgraph, the first and second intermediate transaction subgraphs being distinct and belonging to the two or more intermediate transaction subgraphs;
      extracting from the first and second intermediate transaction subgraphs each vertex at which at least one of the one or more crossover edges terminates; and
      inserting each extracted vertex into a residual subgraph; and
    applying the two or more transaction subgraphs to the graph database in parallel, wherein applying each transaction subgraph to the graph database comprises applying the two or more operations of the transaction subgraph to the graph database.

14. The computer program product of claim 13, the method further comprising synchronously applying the residual subgraph to the graph database.

15. The computer program product of claim 13, wherein the partitioning the transaction graph into two or more transaction subgraphs comprises applying a balanced partitioning algorithm to the transaction graph.

16. The computer program product of claim 15, wherein the applying the balanced partitioning algorithm comprises executing one or more normalized cuts on the transaction graph.

17. The computer program product of claim 13, wherein the graph database represents a social network.

* * * * *